(12) United States Patent
Saito

(10) Patent No.: US 6,857,003 B2
(45) Date of Patent: Feb. 15, 2005

(54) METHOD OF GENERATING RANDOM NUMBERS

(75) Inventor: Yoshiaki Saito, Niigata Pref. (JP)

(73) Assignee: Niigata University, Niigata Pref. (JP)

( * ) Notice: Subject to any disclaimer, the term of this patent is extended or adjusted under 35 U.S.C. 154(b) by 132 days.

(21) Appl. No.: 09/904,329

(22) Filed: Jul. 12, 2001

(65) Prior Publication Data

US 2002/0042806 A1 Apr. 11, 2002

(30) Foreign Application Priority Data

Jul. 24, 2000 (JP) ......................... 2000-222525

(51) Int. Cl.⁷ .............. G06G 7/00; G06J 1/00
(52) U.S. Cl. .......................... 708/801; 708/3
(58) Field of Search .............. 708/801, 3, 250–256; 331/78

(56) References Cited

U.S. PATENT DOCUMENTS

| 4,176,399 A | * 11/1979 | Hoffmann et al. .......... 708/250 |
| 4,853,884 A | 8/1989 | Brown et al. |
| 5,153,532 A | * 10/1992 | Albers et al. ................. 331/78 |
| 6,070,178 A | * 5/2000 | Anderson et al. ........... 708/801 |
| 6,188,294 B1 | * 2/2001 | Ryan et al. .................... 331/78 |
| 6,362,695 B1 | * 3/2002 | Beiley et al. ................. 331/78 |
| 6,571,263 B1 | * 5/2003 | Nagai ........................... 708/3 |

FOREIGN PATENT DOCUMENTS

| JP | 59-223848 | 12/1984 |
| JP | 9-46136 | 2/1997 |
| JP | 11-85472 | 3/1999 |

* cited by examiner

Primary Examiner—Tan V. Mai
(74) Attorney, Agent, or Firm—Knobbe Martens Olson & Bear, LLP

(57) ABSTRACT

A method of generating random numbers comprises: generating a first noise and passing the first noise through a first high pass filter which removes a periodic component contained in the first noise to produce a first noise signal having 1/f characteristic; generating a second noise and passing the second noise through a second high pass filter which removes a periodic component contained in the second noise to produce a second noise signal having 1/f characteristic; supplying the first and second noise signals to a differential circuit to derive a different signal between the first noise signal and said second noise signal; and generating, from the different signal, random numbers which do not have a periodicity due to 1/f characteristics of the first and second noise signals.

10 Claims, 4 Drawing Sheets

METHOD OF GENERATING RANDOM NUMBERS

BACKGROUND OF THE INVENTION

1. Field of the Invention

The present invention relates to a method of generating random numbers, and more particularly relates to a method of generating uniform or pure random numbers which do not substantially have a periodicity.

2. Description of the Related Art

Disordered random numbers having equal frequency of occurrence as a whole has been widely utilized in numerical simulation for analyzing social phenomena and physical phenomena. Coding system with random numbers has been also proposed in order to protect personal information in electronic trading, electronic patient charts and remote electronic diagnoses.

In general, random numbers are produced by means of software of electronic computer, in which algorithms for producing numbers with certain distribution properties are utilized. However, in case of generating random number by computer algorithms, since the random numbers are produced in accordance with certain mathematical formulae, pure random numbers having neither periodicity nor regularity could not be generated. Therefore, when important personal date is encoded with the aid of such pseudo-random numbers, encoded data might be easily decoded and no protection could be attained.

In order to mitigate the above mentioned drawback, there has been also proposed to generate random numbers on the basis of electric noises produced from electric elements such as resistor and diode. However, noise produced by a resistor has a so-called 1/f characteristic. That is to say, noise components of lower frequency have higher amplitude and noise components of higher frequency have lower amplitude. Therefore, when random numbers are generated on the basis of bivalent signals which are obtained in accordance with amplitude of noise, there is a problem that the thus generated random numbers have a periodicity due to 1/f characteristic. In this manner, uniform or pure random numbers having no periodicity could not be generated. A diode also produces 1/f noise, and therefore random numbers generated from the diode noise might also have a periodicity.

SUMMARY OF THE INVENTION

The present invention has for its object to provide a method of generating random numbers for generating substantially pure random numbers having no periodicity nor regularity from noise having 1/f characteristic.

According to the invention, a method of generating random numbers comprises the steps of:
producing a first noise having 1/f characteristic from a first noise generator circuit and a second noise having 1/f characteristic from a second noise generator circuit;
supplying said first and second noises having 1/f characteristic produced from the first and second noise generator circuits to a differential circuit to derive a difference signal between said first noise and said second noise; and
generating, from said difference signal, random numbers which have not a periodicity due to 1/f characteristics of the first and second noises.

In the method of generating random numbers according to the invention, although the first and second noises produced by the first and second noise generator circuits have 1/f characteristic, the difference signal derived from these noises does not have a periodicity due to 1/f characteristic owing to a fact that a possibility that noise components having higher frequency, i.e. a higher occurrence frequency are cancelled out becomes higher than a possibility that noise components having lower frequency, i.e. a lower occurrence frequency are cancelled out, and thus an occurrence frequency over a whole frequency range of noise becomes uniform. Therefore, in the difference signal produced from the differential circuit a periodicity due to 1/f characteristic has been cancelled out, and the pure random numbers having no periodicity can be generated.

In a preferable embodiment of the random number generating method according to the invention, the output signal from the differential circuit is supplied to an analog-digital converting circuit and is converted thereby into a digital signal. The digital signal thus generated from the analog-digital converting circuit is used as random numbers. In this case, various kinds of random numbers may be obtained by changing lengths of sections of the digital signal sequence.

In another preferable embodiment of the random number generating method according to the invention, a single digit is obtained from a single bit or a plurality of bits of the digital signal generated from said analog-digital converting circuit, and then this digit is compared with a predetermined threshold level. When a digit is equal to or larger than the threshold level, "1" of a binary number is allocated and when a digit is smaller than the threshold level, "0" of binary number is allocated. In this case, probabilities of occurrence of "1" and "0" are detected, and said threshold level may be adjusted such that the probabilities of occurrence of "1" and "0" become 0.5 or about 0.5. Alternatively, terms during which probabilities of occurrence of "1" and "0" are detected may be adjusted, for instance by means of the generated random numbers.

DESCRIPTION OF THE PREFERRED EMBODIMENTS

Figure 1:
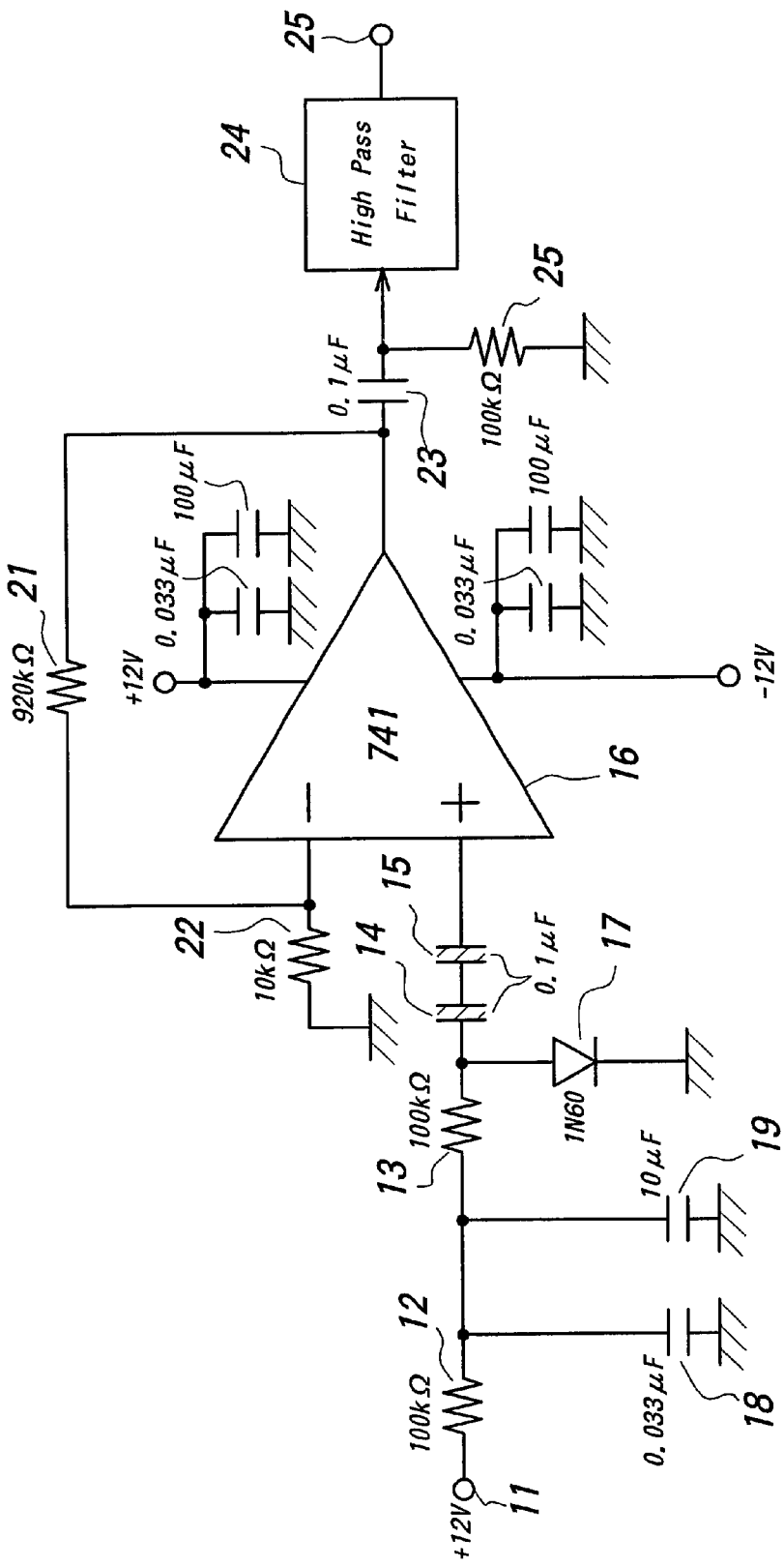
FIG. 1 is a circuit diagram showing an embodiment of a noise generating circuit used in the random number generating method according to the invention.

FIG. 1 is a circuit diagram illustrating an embodiment of a noise generating circuit which is used in the random number generating method according to the invention. In the present embodiment, a diode is utilized as a noise source. Since noise generated by the diode is very weak, the noise is amplified. At the same time, a periodic hum which might be contained in a DC supply source is removed. A terminal 11 to which is applied a DC voltage of 12 volts is connected to a positive input terminal of an amplifier 16 by means of resistors 12, 13 and electrolytic capacitors 14, 15. A common connection point between the resistor 13 and the electrolytic capacitor 14 is connected to an anode of a noise generating diode 17, and a cathode of this diode is connected to the ground. Capacitors 18 and 19 are connected between the ground and a junction point between the resistors 12 and 13.

An output terminal of the amplifier 16 is connected to the ground via feedback resistors 21 and 22, and a junction point between these feedback resistors is connected to a negative input terminal of the amplifier 16. An output terminal of the amplifier 16 is connected via a coupling capacitor 23 to a high pass filter 24. A junction point between the coupling capacitor 23 and the high pass filter 24 is connected to the ground by means of a resistor 25. By providing the high pass filter 24, a periodic component such as hum contained in the noise can be removed. Therefore, at an output terminal connected to the high pass filter 24, there is obtained a noise generated by the diode 17 and amplified by the amplifier 16. This noise has 1/f characteristic and is called noise signal. In FIG. 1, values of the resistors and capacitors are shown for the sake of reference, and it should be noted that the present invention is not limited to these values.

Figure 2:
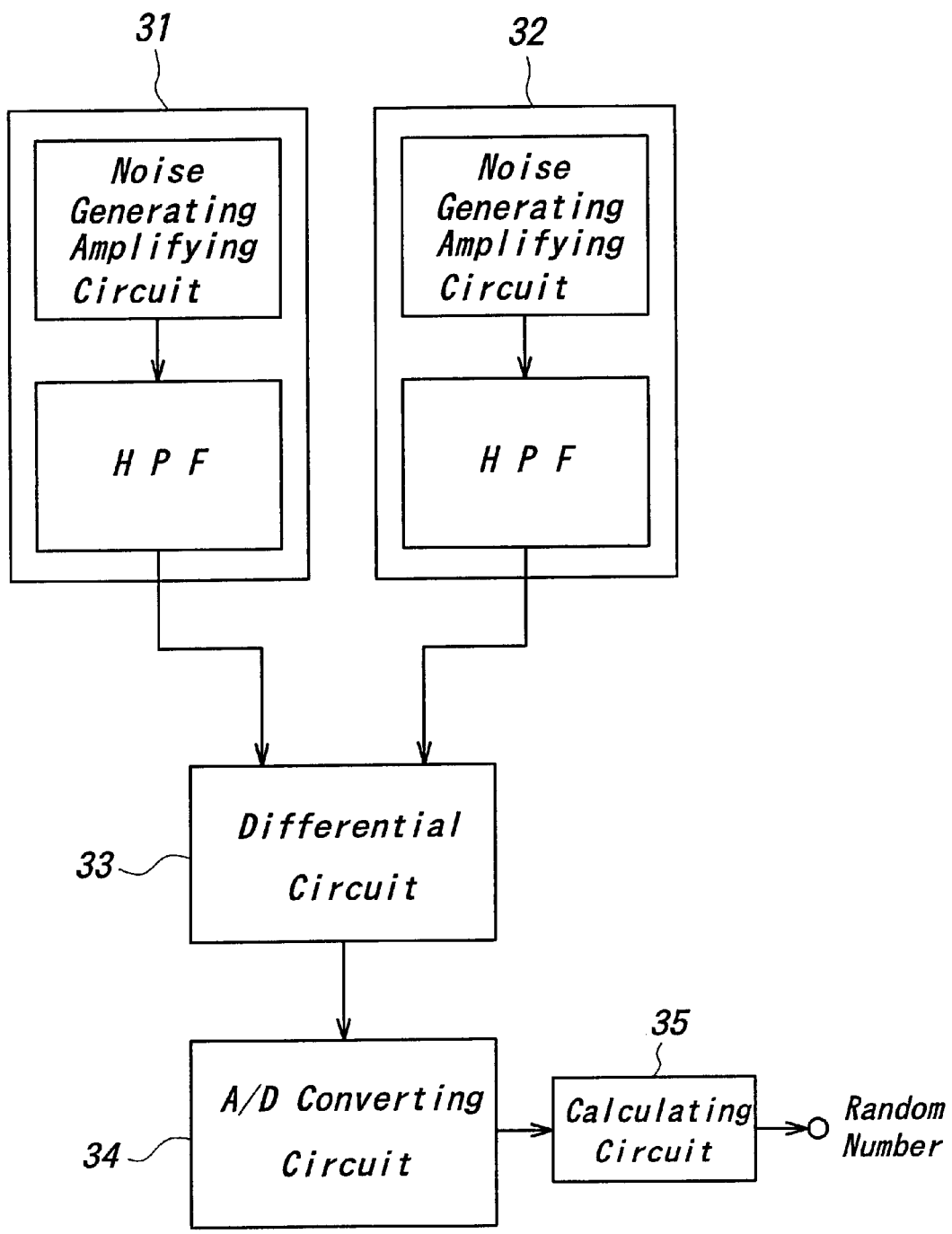
FIG. 2 is a block diagram illustrating an embodiment of the random number generating circuit according to the invention.

FIG. 2 is a block diagram showing an embodiment of the random number generating circuit according to the invention. There are provided first and second noise generating circuits 31 and 32 each being constructed by the noise generating circuit shown in FIG. 1. Noise signals having 1/f characteristic generated from the first and second noise generating circuits 31 and 32 are supplied to a differential circuit 33 and a difference between these noise signals is derived. The noise signal generated from each of the first and second noise generating circuits 31 and 32 has 1/f characteristic, in which a noise component having a lower frequency has a larger amplitude and a noise component having a higher frequency has a smaller amplitude. Therefore, when the noise signal having such 1/f characteristic is subjected to the analog-digital conversion, a frequency of occurrence of a smaller digital signal becomes higher than that of a larger digital signal. This results in a periodicity in the converted digital signal. Therefore, if random numbers are generated from such a digital signal having a periodicity, the random numbers also have a periodicity. In this manner, pure random numbers could not be obtained.

In the present invention, in order to suppress the above mentioned periodicity, the noise signals generated from the first and second noise generating circuits 31 and 32 are supplied to the differential circuit 33 and a difference therebetween is derived. Then, a probability that noise components having higher frequencies is higher than a probability that noise components having lower frequencies, and a frequency of occurrence of noise components having higher frequencies is reduced much more than a frequency of occurrence of noise components having lower frequencies. Therefore, a periodicity of the difference signal produced from the differential circuit 33 is reduced, and random numbers having no periodicity due to 1/f characteristic can be generated by the difference signal from the differential circuit 33.

In the present embodiment, the difference signal from the differential circuit 33 is supplied to an analog-digital converting circuit 34 and is converted into a digital signal. The thus generated digital signal is supplied to a calculating circuit 35. In the calculating circuit 35, the digital signal supplied from the analog-digital converting circuit 34 may be outputted as random numbers, or another random numbers may be outputted by changing sections of the digital-converted value. In the present embodiment, in the calculating circuit 35, a numerical value is formed from a single bit or a plurality of bits of the digital signal, and the thus formed numerical value is compared with a predetermined threshold value to generate bivalent bits "1" and "0" of random numbers.

When "1" and "0" bits generated by a comparison with the threshold value in the calculating circuit 35 are outputted as random numbers, random numbers might differ from pure random numbers owing to a reason that frequencies of occurrence of these "1" and "0" are not controlled. In the present embodiment, in the calculating circuit 35, frequencies of occurrence of "1" and "0" bits are calculated and the threshold level is adjusted such that frequencies of occurrence become 0.5 or about 0.5.

Figure 3:
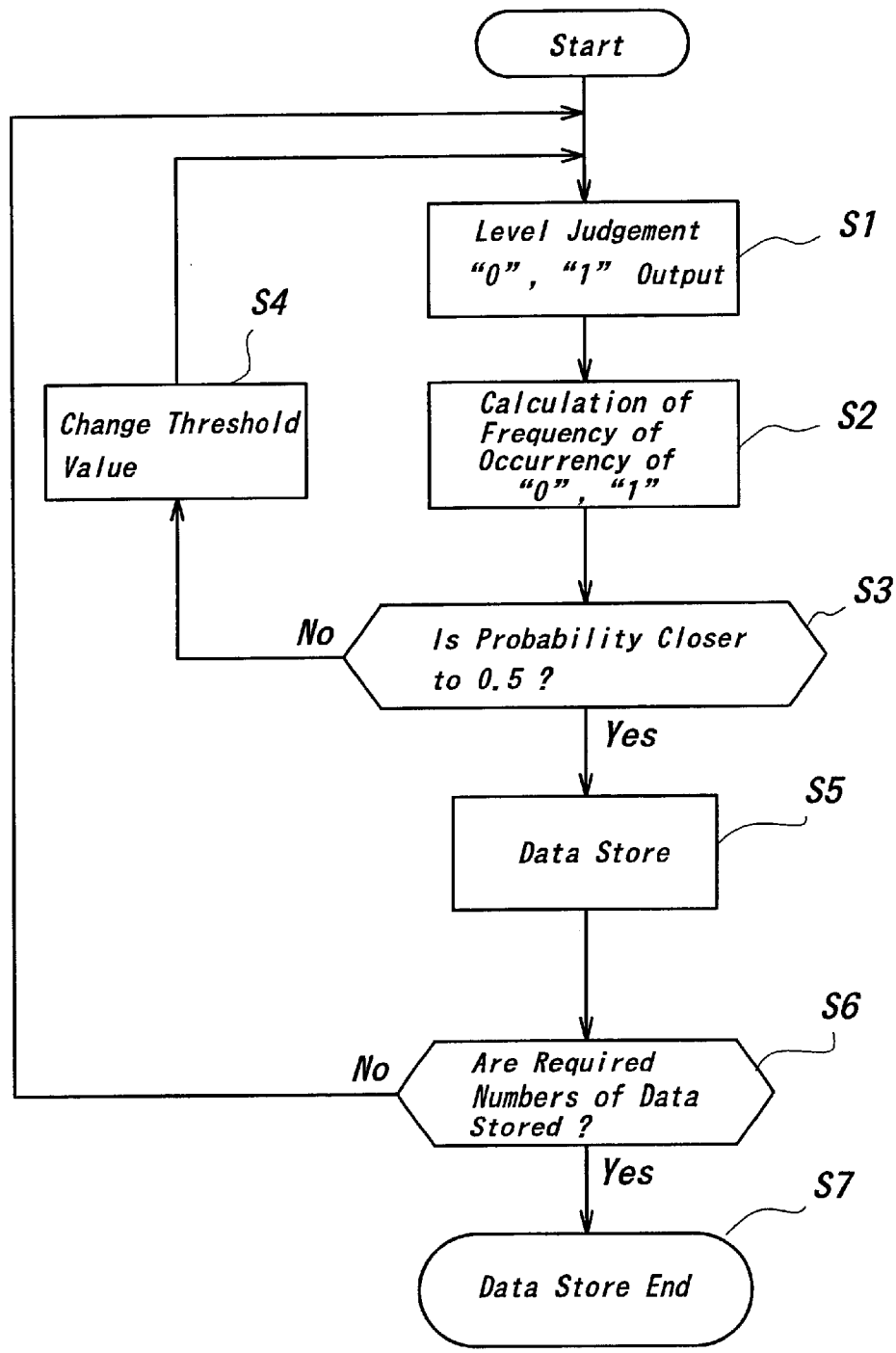
FIG. 3 is a flow chart representing the operation of the random number generating circuit shown in FIG. 2.

FIG. 3 is a flow chart showing a process of generating pure random numbers by calculating frequencies of occurrence of "1" and "0" bits and by adjusting the threshold level such that frequencies of occurrence become 0.5 or about 0.5. In a step S1, a magnitude of a digital signal supplied from the analog-digital converting circuit 33 is compared with the threshold level, and "1" bit is produced when the digital signal is not less than the threshold level and "0" bit is generated when the digital signal is less than the threshold level. Next, in a step S2, frequencies of occurrence of "1" bit and "0" bit are calculated for a predetermined period.

Furthermore, in a step S3, it is judged whether or not the calculated frequencies of occurrence of "1" bit and "0" bit come closer to 0.5. If it is judged that the frequencies of occurrence do not come closer to 0.5, in a step S4, the threshold level is changed. In this case, when a frequency of occurrence of "1" bit is higher than a frequency of occurrence of "0" bit, the threshold level is increased, but when a frequency of occurrence of "1" bit is lower than a frequency of occurrence of "0" bit, the threshold level is decreased.

By repeating the above mentioned steps, frequencies of occurrence of "1" bit and "0" bit becomes closer to 0.5, and when it is judged in the step S3 that frequencies of occurrence of "1" bit and "0" bit becomes closer to 0.5, data of random numbers consisting of "1" bit and "0" bit is recorded in a step S5, and when it is confirmed in a step S6 that a required number of random numbers have been recorded, the recording of random numbers is finished in a step S7.

Figure 4:
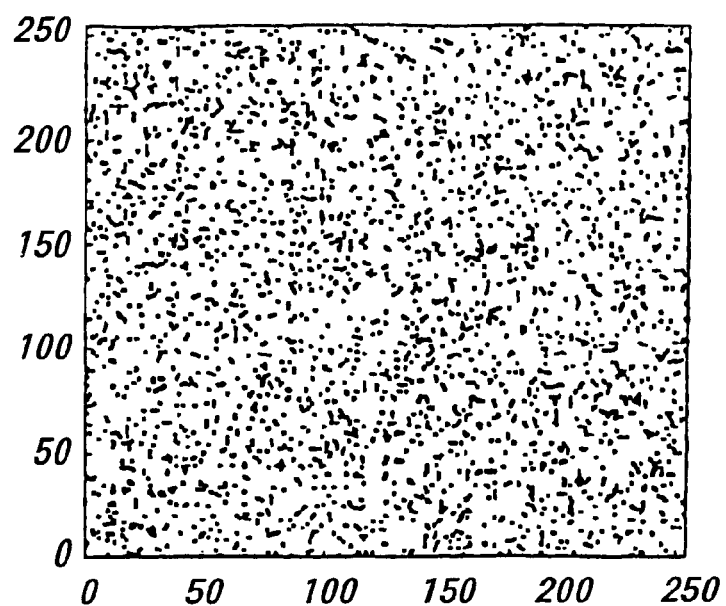
FIG. 4 is a diagram showing a distribution of random numbers generated by the method according to the invention.
Figure 5:
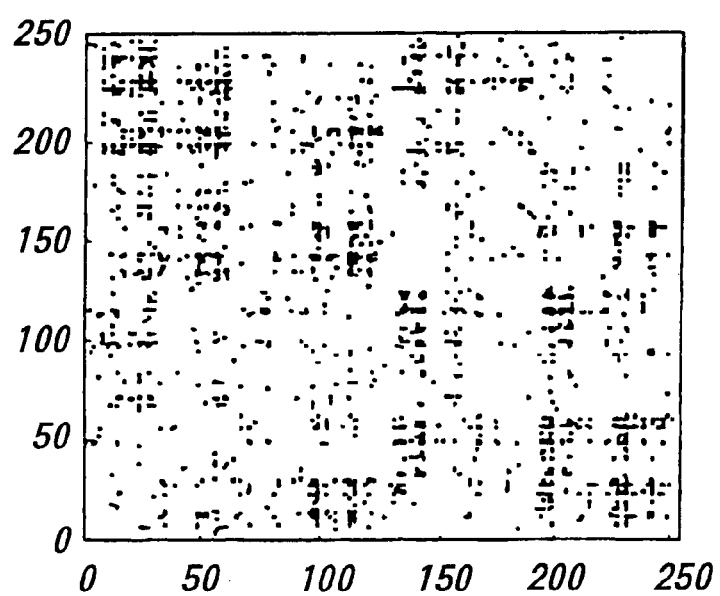
FIG. 5 is a diagram representing a distribution of random numbers generated by a known method.

FIG. 4 is a diagram showing a distribution of random numbers generated by the method according to the invention. In FIG. 4, there are plotted 3000 points each of which is determined such that a generated binary number is divided by every 16 bits and values defined by first and last eight bits are plotted on vertical and horizontal axes, respectively. FIG. 5 is a diagram illustrating a distribution of random numbers of known method in which only a single noise generating circuit is used. In the method according to the invention, 3000 points are distributed uniformly, and therefore it is understood that random numbers do not have a periodicity due to 1/f characteristic of a noise generating source. However, in the known method shown in FIG. 5, points are collected in certain regions to form splashed patterns, and thus random numbers have a periodicity.

The present invention is not limited to the embodiment explained above, but many alternations and modifications may be conceived by a person skilled in the art within the scope of the invention. For instance, in the above embodiment, the noise generating source for generating noise having 1/f characteristic is constituted by the diode, but it may be formed by another element such as a resistor.

As explained in detail, in the method according to the invention, 1/f characteristic of noise can be suppressed by obtaining a difference between two noises generated from the two noise generating circuits and pure random numbers having no periodicity can be generated from said difference. When codes are generated by using such random numbers, they could not be decoded easily. This contributes to an improvement of a security of important information and a social value of the present invention is very large. Moreover, according to the invention, character of random numbers can be adjusted by controlling frequencies of occurrence of binary numbers "1" and "0", and therefore information encoded in accordance with such random numbers could not be decoded much more easily.

What is claimed is:

1. A method of generating random numbers comprising the steps of:

generating a first noise and passing the first noise through a first high pass filter which removes a periodic component contained in the first noise to produce a first noise signal having 1/f characteristic from a first noise generator circuit and;

generating a second noise and passing the second noise through a second high pass filter which removes a periodic component contained in the second noise to produce a second noise signal having 1/f characteristic from a second noise generator circuit;

supplying said first and second noise signals having 1/f characteristic to a differential circuit to derive a difference signal between said first noise signal and said second noise signal; and generating, from said difference signal, random numbers which do not have periodicity due to 1/f characteristics of the first and second noise signals.

2. A method according to claim 1, wherein the difference signal produced by the differential circuit is converted by an analog-digital converting circuit into a digital signal, and the thus converted digital signal is outputted as random numbers.

3. A method according to claim 2, wherein nature of the random numbers is adjusted by changing sections of the digital signal.

4. A method according to claim 2, wherein a single digit is obtained from a single bit or a plurality of bits of the digital signal generated from said analog-digital converting circuit, the thus obtained digit is compared with a predetermined threshold level, and when a digit is equal to or larger than the threshold level, "1" of a binary number is allocated and when a digit is smaller than the threshold level, "0" of binary number is allocated.

5. A method according to claim 4, wherein probabilities of occurrence of "1" and "0" are detected for a given period, and said threshold level is adjusted such that the probabilities of occurrence of "1" and "0" become to given values.

6. A method according to claim 5, wherein said threshold level is adjusted such that the probabilities of occurrence of "1" and "0" become to 0.5 or about 0.5.

7. A method according to claim 5, wherein said period during which the probabilities of occurrence of "1" and "0" are detected is adjusted.

8. A method according to claim 7, wherein said period during which the probabilities of occurrence of "1" and "0" are detected is adjusted in accordance with the generated random numbers.

9. A method according to claim 1, wherein said first and second noises are generated by a first noise generating element provided in a first noise generating circuit and a second noise generating element provided in a second noise generating circuit, respectively.

10. A method according to claim 1, wherein the generating of the first noise or the second noise is formed by diode or resistor.

* * * * *